United States Patent
Moody

[11] Patent Number: 6,029,367
[45] Date of Patent: Feb. 29, 2000

[54] GRAIN DRYING APPARATUS

[75] Inventor: Gene Moody, Calgary, Canada

[73] Assignee: Underbalanced Drilling Systems Limited, Canada

[21] Appl. No.: 09/052,534

[22] Filed: Mar. 31, 1998

Related U.S. Application Data

[63] Continuation-in-part of application No. 08/912,041, Aug. 15, 1997, abandoned.

[51] Int. Cl.[7] ...................................................... F26B 19/00
[52] U.S. Cl. ................................. 34/212; 34/218; 34/219; 237/12.3 A; 237/12.3 C; 237/1 R; 60/286; 60/320
[58] Field of Search ................................ 34/86, 201, 210, 34/212, 218, 219, 234; 237/1 R, 12.1, 12.3 A, 12.3 C; 165/51; 60/286, 320

[56] References Cited

U.S. PATENT DOCUMENTS

| | | | |
|---|---|---|---|
| 2,256,030 | 9/1941 | Williams | 237/1 R |
| 3,834,294 | 9/1974 | Wurdeman | 454/176 |
| 4,010,552 | 3/1977 | Peterson | 34/179 |
| 4,038,021 | 7/1977 | Benson | 432/112 |
| 4,146,176 | 3/1979 | Beauvais et al. | 237/12.3 A |
| 4,291,834 | 9/1981 | Palazzetti et al. | 237/12.1 |
| 5,156,570 | 10/1992 | Justice | 460/118 |

FOREIGN PATENT DOCUMENTS

| | | | |
|---|---|---|---|
| 1099914 | 8/1928 | Canada | 34/44 |
| 2188405 | 9/1987 | United Kingdom | F26B 17/14 |

*Primary Examiner*—Pamela A. Wilson
*Attorney, Agent, or Firm*—Young & Basile, PC.

[57] ABSTRACT

A grain drying apparatus uses the heat of an engine to aid in the evaporative process. The grain drying apparatus provides an engine 20 which is used to power a fan 40. Waste heat generated by the engine is transferred to air driven by fan 40 through air duct 70 by three principle means. Air is initially warmed by contact with the engine and its radiator prior to entering the air duct 60. An exhaust pipe 50 and catalytic converter 52, carried by the engine, extends a part of the length of the elongated air duct 70, warming the air flow within the duct by contact. A finned heat exchanger tube 60, also carried within the elongated air duct, transfers heat to the air flow within the duct. An air intake pipe transfers air under pressure into a fuel tank, where the air mixes with fuel vapors. The air and fuel vapor mix is then transferred to the exhaust pipe, where combustion takes place, thereby increasing the heat flow from the finned heat exchanger. Cooled exhaust gas from the finned heat exchanger tube 60 is optionally routed through a dehydration canister and into the grain storage area where the treated exhaust gasses displace the air, providing an atmosphere which protects the grain from bacteria, insects and rodents.

5 Claims, 2 Drawing Sheets

GRAIN DRYING APPARATUS

CROSS-REFERENCES

This is a continuation-in-part of application Ser. No. 08/912,041 filed Aug. 15, 1997, now abandoned.

BACKGROUND

The need to dry grain before storage is well-known. Failure to adequately dry grain can result in mold, contamination and insect infestation, which in turn will result in a reduction in storage life and consequently heavy financial losses.

Known grain drying systems have employed augers to stir the grain, and gas-fired heaters to provide the heat necessary to dry the grain. Unfortunately, the fuel to operate gas-fired heaters and to turn augers results in substantial expense.

A further drawback to gas-fired heaters is contact between untreated exhaust gases and the grain being dried. Various exhaust gas constituents present in untreated exhaust gasses, such as sulfur dioxide, moisture and unburned hydrocarbons, if allowed to come in direct contact with the damp grain may cause a variety of undesirable reactions such as flavoring of the grain and acidification of residual water vapor.

What is needed is grain drying apparatus that does not require an expensive gas-fired heater or augers, that rapidly dries damp grain without damaging it. The grain drying apparatus should also treat the exhaust gasses in an inexpensive manner, thereby allowing the treated gasses to be used to displace the ambient air from the grain storage area forming an unattractive environment for bacteria, insects and rodents.

SUMMARY

The present invention is directed to an apparatus that satisfies the above needs. The grain drying apparatus of the present invention provides some or all of the following structures.

(A) An engine provides the power needed to operate a fan, and much of the heat needed to dry the grain.

(B) An engine enclosure is sized to carry the engine and to control the heat flow from the engine. The engine enclosure defines a cold air inlet and a warm air outlet.

(C) An upper exhaust pipe delivers exhaust from the engine into a catalytic converter, which processes the exhaust gasses.

(D) A lower exhaust pipe delivers the exhaust gasses from the catalytic converter to a finned heat exchanger tube. Hot exhaust gasses moving through the finned heat exchanger tube dissipate heat energy from the radially directed fins, thereby heating air moving within the elongated air duct, and cooling the exhaust.

(E) An upper exhaust conduit delivers cooled exhaust gasses from the finned heat exchanger tube to a dehydration canister, where water is removed from the gasses. The gasses, having been treated by the catalytic converter and by the dehydration canister, may then be routed into the grain storage area by a lower exhaust conduit. The water, having been removed from the gasses, may be collected or discharged, as desired.

(F) An elongated air duct encloses the catalytic converter and finned heat exchanger tube. The elongated air duct includes a first end defining a cold air inlet and a second end defining a warm air outlet. Air is warmed as it moves through the air duct, by contact with the exhaust pipe, associated catalytic converter, and by contact with the finned heat exchanger tube. An insulating layer, adjacent to and surrounding the elongated air duct, reduces the radially outward heat flow from the duct, causing a greater percentage of the heat energy released by the engine, exhaust pipe, catalytic converter and finned heat exchanger to be removed by airflow within the elongated air duct.

(G) At least one fan, driven by the engine, drives air through the elongated air duct and into the grain drying or storage area.

(H) An air intake pipe diverts high pressure air from within the elongated air duct to an air space above the fuel tank. Fuel vapors are mixed then with the air, and the resulting mixture is diverted through fuel vapor delivery pipe into the upper exhaust pipe and catalytic converter for combustion. The heat of combustion results in additional heat transfer from the catalytic converter and finned heat exchanger to the air traveling within the elongated air duct.

It is therefore a primary advantage of the present invention to provide a novel grain drying apparatus that uses recycled heat from an internal combustion engine, and that does not require a gas-fired heater to provide heat for the grain drying process.

Another advantage of the present invention is to provide a grain drying apparatus having means to process exhaust gasses including a catalytic converter and a dehydration canister which condition the exhaust gasses for introduction into the grain storage area, thereby providing an artificial atmosphere which promotes grain storage.

Another advantage of the present invention is to provide a grain drying apparatus having an elongated air duct enclosing a catalytic converter and a finned heat exchanger tube, whereby heat energy may be transferred from exhaust gasses moving through the finned heat exchanger tube to air moving through the air duct without the requirement of exhaust gases coming in contact with the grain.

A still further advantage of the present invention is to provide a grain drying apparatus having means to transfer a mixture of air and fuel vapor into the engine's exhaust pipe and catalytic converter for combustion, thereby producing additional heat for drying the grain.

DRAWINGS

These and other features, aspects, and advantages of the present invention will become better understood with regard to the following description, appended claims, and accompanying drawings where:

DESCRIPTION

Figure 1:
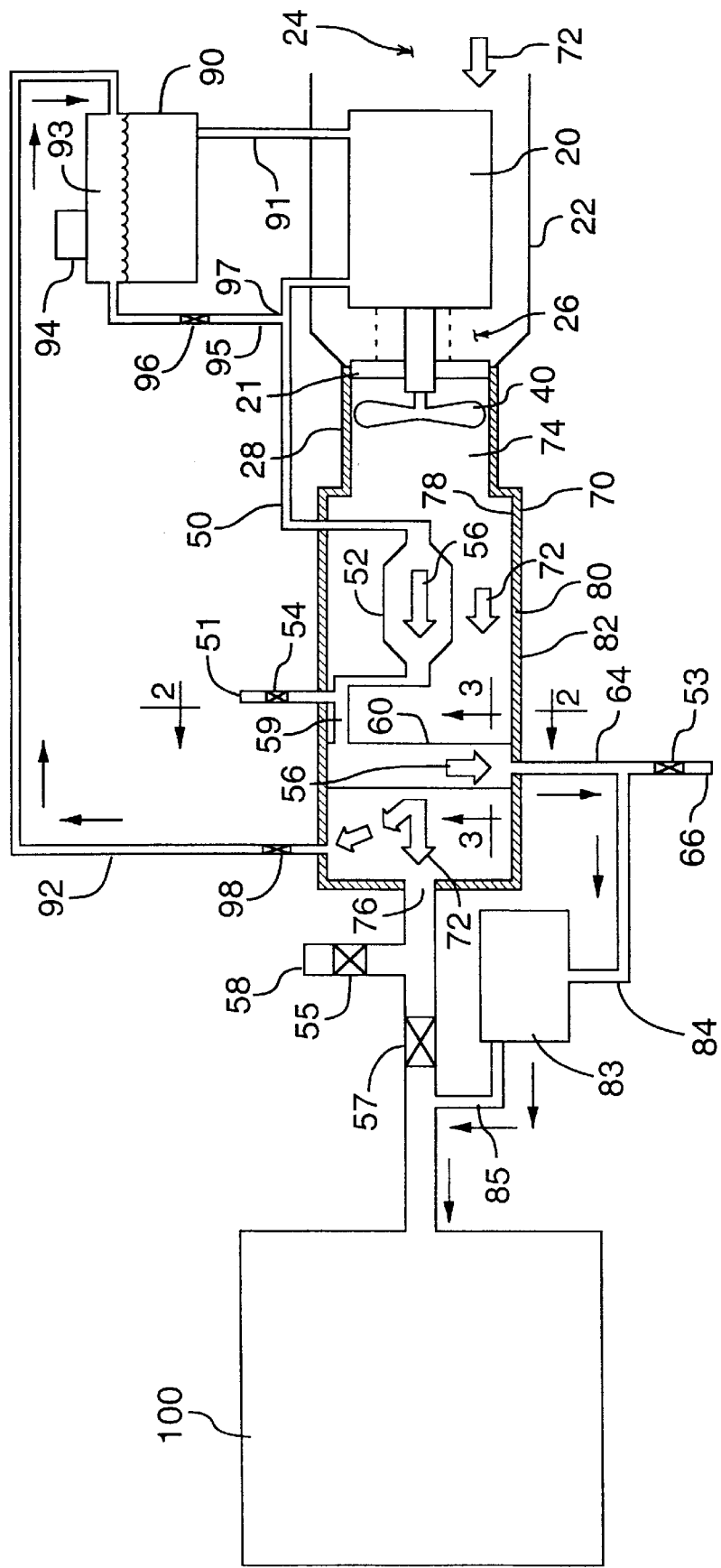
FIG. 1 is a somewhat diagrammatic view of a version of the grain drying apparatus of the invention, showing the engine, engine enclosure, elongated air duct and finned heat exchanger tube, wherein various elements including the length of the elongated air duct and finned heat exchanger are not shown to scale.
Figure 2:
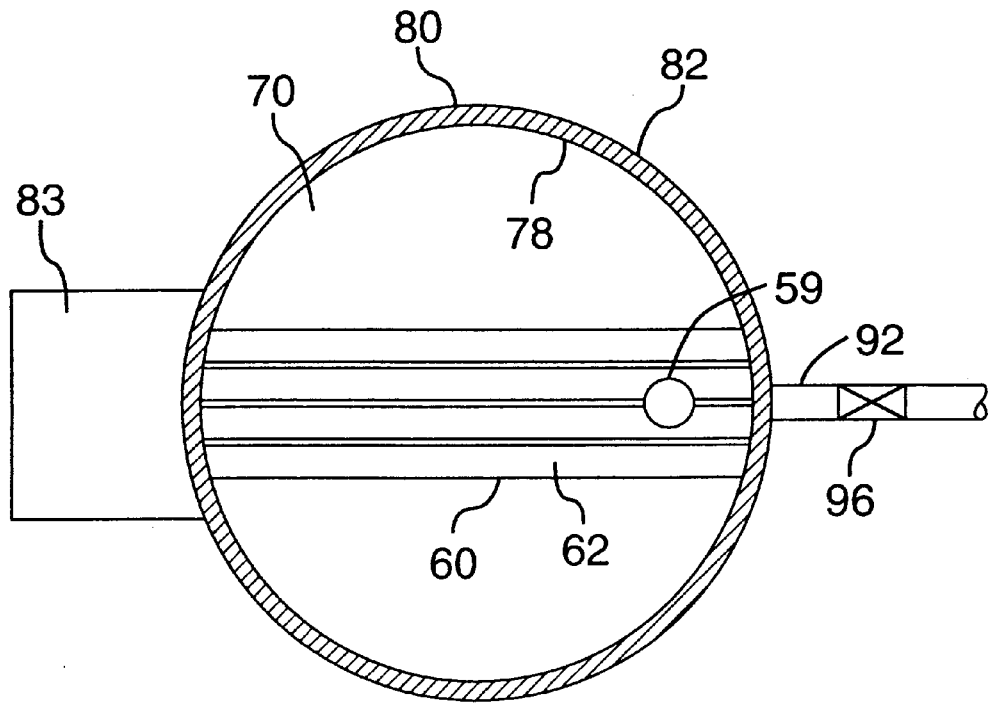
FIG. 2 is a cross-sectional view of the elongated air duct, showing the finned heat exchanger, dehydration canister and upstream exhaust vent.

Referring to FIG. 1, a diagrammatic view of a grain drying apparatus constructed in accordance with the principles of the invention is seen. The grain drying apparatus provides an engine 20 which is used to power a fan 40. Waste heat generated by the engine is transferred to air driven by the fan through an elongated air duct 70 by three principle means. Initially, air is warmed by contact with the engine and its radiator prior to entering the elongated air duct 70. Air is further warmed by contact with an exhaust pipe 50 and catalytic converter 52 which extend from the engine within the air duct 70. And finally, exhaust gasses are routed from the exhaust pipe through the finned tube heat exchanger 60. The exhaust gasses from the engine are either discharged into the atmosphere or processed by the catalytic converter and a dehydration canister, thereby making the gasses suitable for discharge into the grain storage area 100.

An engine 20 is typically gasoline- or diesel-powered, and is supplied by a fuel line 91 from a fuel tank 90, having a refill lid 94. The sized of the engine depends on the application. In a typical application, the engine must drive one or more fans 40.

At least one fan 40, driven by a direct drive coupling or other power transfer means off the engine, propels the air flow 72 through the elongated air duct 70, where it is heated In a typical embodiment of the invention, the engine's radiator 21 is located within the engine enclosure 22. An additional fan is used to cool the radiator, thereby transferring heat energy into the air flow 72.

An engine enclosure 22 is sized to carry the engine and its attached radiator 21 in a generally tight-fitting manner. An engine enclosure having excessive size tends to result in excessive dissipation of the heat. The engine enclosure defines a cold air inlet 24 which allows cool air from the atmosphere to enter the engine enclosure, where it absorbs heat energy. Having been warmed by the engine and its radiator, the warmed air exits the engine enclosure through the warm air outlet 26.

A heat conduit 28, allows warm air to leave the engine enclosure and enter the elongated air duct 70. The heat conduit provides a first end in communication with the warm air outlet 26 of the engine enclosure and a second end in communication with the elongated air duct 70. A low air pressure area, to the rear of the fan 40, draws air through the heat conduit 28, which is sized to allow passage of sufficient hot air to cool the engine.

An elongated air duct 70 contains a directed air flow 72, which is driven by the fan 40. The elongated air duct provides a first end defining an air inlet 74 and a second end defining a warm air outlet 76, typically having a warm air release valve 57. As seen in FIG. 1, the elongated air duct defines an air channel enclosing an upper exhaust pipe 50, catalytic converter 52, lower exhaust pipe 59 and finned heat exchanger 60.

A warm air exhaust valve 55 regulates a warm air exhaust port 58, which may be used to route the air flow 72 into the atmosphere, if desired.

In a preferred embodiment, the elongated air duct 70 provides a double-wall construction, having an inner wall 78 and the outer wall 82. An insulating layer 80, carried between the inner and outer walls, slows heat loss from within the air duct to the surrounding atmosphere, thereby increasing efficiency.

An upper exhaust pipe 50, having a first end carried by the engine, extends through an axial region of the air duct 70, as seen in FIG. 1. The upper exhaust pipe typically carries a catalytic converter 52 or muffler. A lower exhaust pipe 59 transfers exhaust gasses 56 from the catalytic converter to the finned heat exchanger tube 60. Both the exhaust pipes and catalytic converter transfer heat energy to the air flow 72 moving through the air duct 70. If desired, particularly where the system is temporarily clogged, the exhaust may be vented to the atmosphere through an upstream exhaust vent 51, controlled by valve 54, prior to being routed through the finned heat exchanger tube. Valve 54 may be pressure-activated, turning on when pressure within the system is excessive.

A finned heat exchanger tube 60 is connected at a first end to the catalytic converter 52 or to a lower exhaust pipe 59, and at a second end to the exhaust port 66 having a valve 53, which allows exhaust gasses 56 to be vented to the atmosphere. The finned heat exchanger is designed to efficiently transfer the heat energy carried by the exhaust to the air flow 72 moving through the elongated air duct 70.

Figure 3:
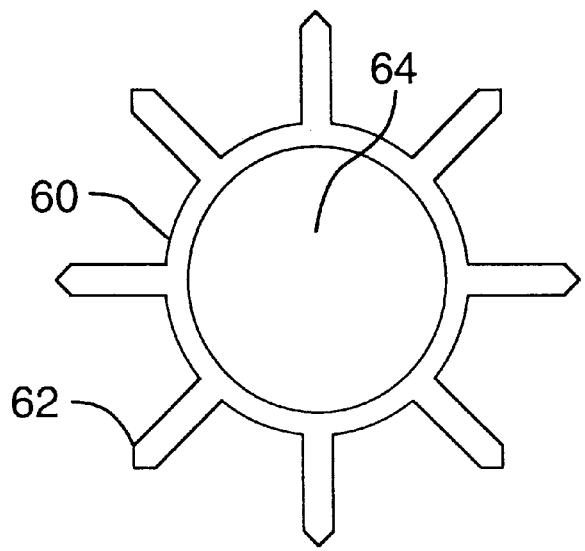
FIG. 3 is a cross-sectional view of the finned heat exchanger tube, taken along the 2—2 lines of FIG. 1.

The construction of the finned heat exchanger tube 60 is best seen in the cross-sectional view of FIG. 3, where a steel tube having radially directed fins 62 defines a passage 64 through which cooling exhaust gases pass. The use of fins 62 increases the surface area of the heat exchanger tube 60, and therefore the transfer of heat energy to the air flow 72.

Referring generally to FIG. 1, it can be seen that a mixture of air and fuel vapors from the air space 93 above the fuel in the fuel tank 90 may be introduced into the exhaust pipe 50, which is then transferred to the catalytic converter 52. The mixture of air and fuel vapors burns, thereby increasing the heat transfer to the air flow 72 through the elongated air duct 70.

Referring to the detail of FIG. 1, a control valve 98 regulates the flow of air from the elongated air duct 70 into an air intake pipe 92. With the valve open, air flows through intake pipe 92 into the air space 93 above the fuel in the fuel tank 90, where it mixes with fuel vapors. The mixture of air and fuel vapors is routed from the fuel tank through safety valve 96 in the fuel vapor delivery pipe 95. The safety valve prevents combustion of the fuel vapor in space 93, within the fuel tank. The air and fuel vapor mixture enters the upper exhaust pipe 50 at fuel vapor entry port 97. The air and fuel vapor mixture is transferred by the upper exhaust pipe to the catalytic converter 52, where combustion of the air and fuel vapor mixture is completed.

Combustion of the air and fuel vapor mixture within the exhaust pipe 50 and catalytic converter 52 produces additional heat, which is transferred through the finned heat exchanger tube 60, thereby additionally warming the air flow 72 passing through the elongated air duct 70.

In a preferred embodiment of the invention, a safety valve 96 prevents the air and fuel mixture in the fuel vapor delivery pipe 95 from burning, and resulting in combustion or explosion of the fuel carried in tank 90. The flow of the air and fuel vapor mixture is restricted by safety valve 96 unless the pressure in the air space 93 above the fuel is sufficiently greater than the pressure in the exhaust pipe 50. This pressure differential causes a flow rate of the air and fuel vapor mixture that prevents fire from moving up the fuel vapor delivery pipe 95 and into the fuel tank 90.

The rate of air flow through the in-take pipe 92 and the fuel vapor delivery pipe 95 may be carefully regulated, by use of valves 96 and 98, to result in the desired level of combustion in the exhaust pipe 50 and catalytic converter 52. Additional fans may be used to regulate and increase the rate of air flow and direction within air intake and fuel vapor delivery pipes 92 and 95, if desired.

An upper exhaust conduit 84 transfers cooled exhaust gasses from the downstream end of the finned heat exchanger tube into a dehydration canister 83, where water is removed from the exhaust. A lower exhaust conduit 85 then transfers the dehydrated exhaust into the grain storage area. Removal of the water from the exhaust gasses tends to prevent bacterial degradation of the grain.

To operate a grain drying apparatus, the engine is started and operated until warm. Operation of the engine results in operation of the fan 40, which results in air flow through the air duct 70. As the engine warms, heat flows from the engine, through the heat conduit 28, into the air inlet 74 of the air duct 70. Heat is also transferred from the exhaust pipe 50 and catalytic converter 52 to air flowing through the air duct. Heat still remaining in the exhaust gasses is also transferred to the air flow 72 by the finned heat exchanger 60. The cooled exhaust gasses then exit from the exhaust port 66 and are discharged into the atmosphere. The exhaust gas may optionally be heated to higher temperatures by allowing a mixture of air and fuel vapor to flow from the fuel vapor delivery pipe 95 to the exhaust pipe 50. The additional heat results when the catalytic converter ignites the air and fuel vapor mixture. By closing down stream exhaust valve 53, exhaust gasses may be routed through the dehydration canister 83, and into the grain storage area. This provides additional heat for drying, and also tends to prevent insect, rodent and other contaminants from spoiling the grain.

The heated air flow 72, leaving the air outlet 76, is then directed to a grain storage area for drying damp or wet grain. In a typical application, the grain is stored in a silo or similar structure wherein the grain is supported off the ground by a screen. The heated air flow 72 is then directed into the silo at the ground level, below the stored grain. The warm, dry air then rises, through the stored grain, evaporating moisture carried by the grain.

The previously described versions of the present invention have many advantages, including a primary advantage of providing a novel grain drying apparatus that uses recycled heat from an internal combustion engine, and that does not require a gas-fired heater to provide heat for the grain dying process.

Another advantage of the present invention is to provide a grain drying apparatus having means to process exhaust gasses including a catalytic converter and a dehydration canister which condition the exhaust gasses for introduction into the grain storage area, thereby providing an artificial atmosphere which promotes grain storage.

Another advantage of the present invention is to provide a grain drying apparatus having an elongated air duct enclosing a catalytic converter and a finned heat exchanger tube, whereby heat energy may be transferred from exhaust gasses moving through the finned heat exchanger tube to air moving through the air duct without the requirement of untreated exhaust gases coming in contact with the grain.

A still further advantage of the present invention is to provide a grain drying apparatus having means to transfer a mixture of air and fuel vapor into the engine's exhaust pipe and catalytic converter for combustion, thereby producing additional heat for drying the grain.

Although the present invention has been described in considerable detail and with reference to certain preferred versions, other versions are possible. For example, while the above description makes reference to a catalytic converter, the apparatus would also be operable without such a converter. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A grain drying apparatus, comprising:
   (A) an engine;
   (B) an engine enclosure, sized to carry the engine, defining a cold air inlet and a warm air outlet;
   (C) an exhaust pipe, having a first and second end, the first end carried by the engine;
   (D) a finned heat exchanger tube having a first end in communication with the second end of the exhaust pipe and a second end of the finned heat exchanger in communication with an exhaust port; a means for introducing a mixture or air and fuel vapors into the exhaust pipe, thereby causing additional combustion and increasing the heat energy transfer from the finned heat exchanger;
   (E) an elongated air duct, having a first end defining a cold air inlet and a second end defining a warm air outlet, defines an air channel enclosing the finned heat exchanger and a radiator portion of the engine being carried within the elongated air duct;
   (F) at least one fan, driven by the engine, for driving air through the elongated air duct.

2. The grain drying apparatus of claim 1 wherein the exhaust port is in communication with a grain storage area, whereby exhaust gasses travel from the exhaust port into the grain storage area.

3. The grain drying apparatus of claim 1 wherein the exhaust port is in communication with a catalytic converter, whereby exhaust gasses travel from the exhaust port into the catalytic converter.

4. The grain drying apparatus of claim 1 wherein the exhaust port is in communication with a dehydration canister, whereby exhaust gasses travel from the exhaust port into the dehydration canister.

5. A grain drying apparatus, for supplying a heated, moving air flow to an area of grain storage, the grain drying apparatus comprising:
   (A) an engine;
   (B) an engine enclosure, sized to carry the engine, defining a cold air inlet and a warm air outlet;
   (C) a catalytic converter, having a first end in communication with an exhaust pipe carried by the engine;
   (D) a finned heat exchanger tube having a first end in communication with the catalytic converter and a second end in communication with an exhaust port;
   (E) an elongated air duct, having a first end defining a cold air inlet and a second end defining a warm air outlet, defines an air channel enclosing the finned heat exchanger;
   (F) at least one fan, driven by the engine, for driving air through the elongated air duct;
   (G) an insulation layer, adjacent to and surrounding the elongated air duct, to reduce heat loss and to increase heat transfer from the elongated air duct; and
   (H) means for introducing a mixture of air and fuel vapors into the catalytic converter, comprising an in-take pipe in communication with an air space within a fuel tank and a fuel vapor delivery pipe connecting the air space within the fuel tank with the exhaust pipe, thereby causing additional combustion and increasing the heat energy transfer from the finned heat exchanger.

\* \* \* \* \*